(12) United States Patent
Harvey et al.

(10) Patent No.: US 12,087,338 B1
(45) Date of Patent: Sep. 10, 2024

(54) HAMR READ-WRITE HEAD WITH COUPLER AND WAVEGUIDE

(71) Applicant: Seagate Technology LLC, Fremont, CA (US)

(72) Inventors: Christopher Neil Harvey, Londonderry (GB); Aidan Dominic Goggin, Donegal (IE); Chuan Zhong, Londonderry (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/851,159

(22) Filed: Jun. 28, 2022

Related U.S. Application Data

(60) Provisional application No. 63/215,955, filed on Jun. 28, 2021.

(51) Int. Cl.
| | |
|---|---|
| *G11B 11/105* | (2006.01) |
| *G11B 5/39* | (2006.01) |
| *G11B 5/48* | (2006.01) |
| *G11B 5/60* | (2006.01) |
| *G11B 5/73* | (2006.01) |
| *G11B 20/10* | (2006.01) |

(52) U.S. Cl.
CPC .......... *G11B 5/7375* (2019.05); *G11B 5/3967* (2013.01); *G11B 5/4866* (2013.01); *G11B 5/6052* (2013.01)

(58) Field of Classification Search
CPC ................ G11B 5/3146; G11B 5/1278; G11B 2005/0021; G11B 5/3133; G11B 5/3906; G11B 5/09; G11B 5/314; G11B 5/4866; G11B 5/6088; G11B 11/105; G11B 11/10; G11B 5/39; G11B 11/10506; G11B 11/1051
USPC .......................................................... 360/59
See application file for complete search history.

(56) References Cited

U.S. PATENT DOCUMENTS

| | | | | |
|---|---|---|---|---|
| 8,031,991 | B2* | 10/2011 | Webster | G02B 6/1228 385/28 |
| 9,099,139 | B2 | 8/2015 | Gage et al. | |
| 9,251,830 | B1 | 2/2016 | Duda et al. | |
| 9,595,288 | B1 | 3/2017 | Chu et al. | |
| 9,746,623 | B2 | 8/2017 | Peng et al. | |
| 9,786,314 | B1 | 10/2017 | Peng | |
| 9,978,409 | B2 | 5/2018 | Peng | |
| 10,127,937 | B1* | 11/2018 | Wessel | G11B 5/6088 |
| 10,490,221 | B1 | 11/2019 | Chen | |
| 10,783,917 | B1 | 9/2020 | Goggin et al. | |
| 10,971,179 | B1 | 4/2021 | Mehfuz et al. | |
| 11,069,376 | B1* | 7/2021 | McGurk | G11B 5/6088 |
| 2017/0162222 | A1 | 6/2017 | Matousek et al. | |

* cited by examiner

*Primary Examiner* — Nabil Z Hindi
(74) *Attorney, Agent, or Firm* — Kagan Binder, PLLC

(57) ABSTRACT

Described are heat assisted magnetic read-write heads that include a coupler, a waveguide, a transducer, and appurtenant structures.

20 Claims, 6 Drawing Sheets

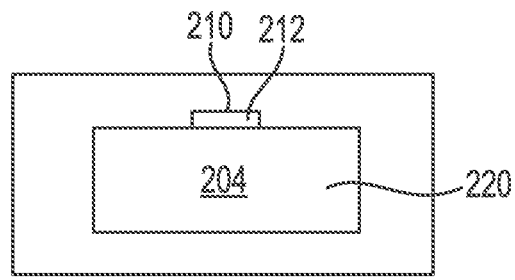
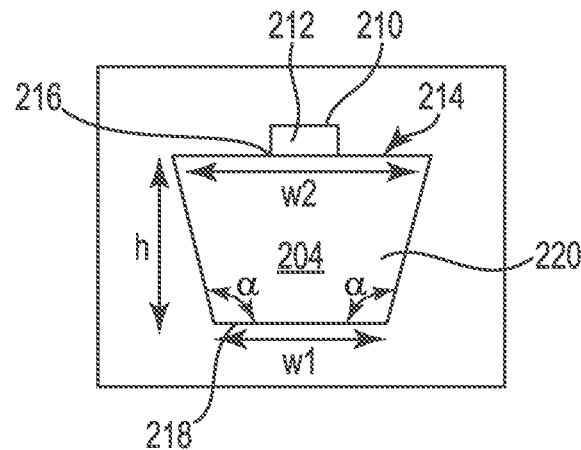
FIG. 4A  FIG. 4B
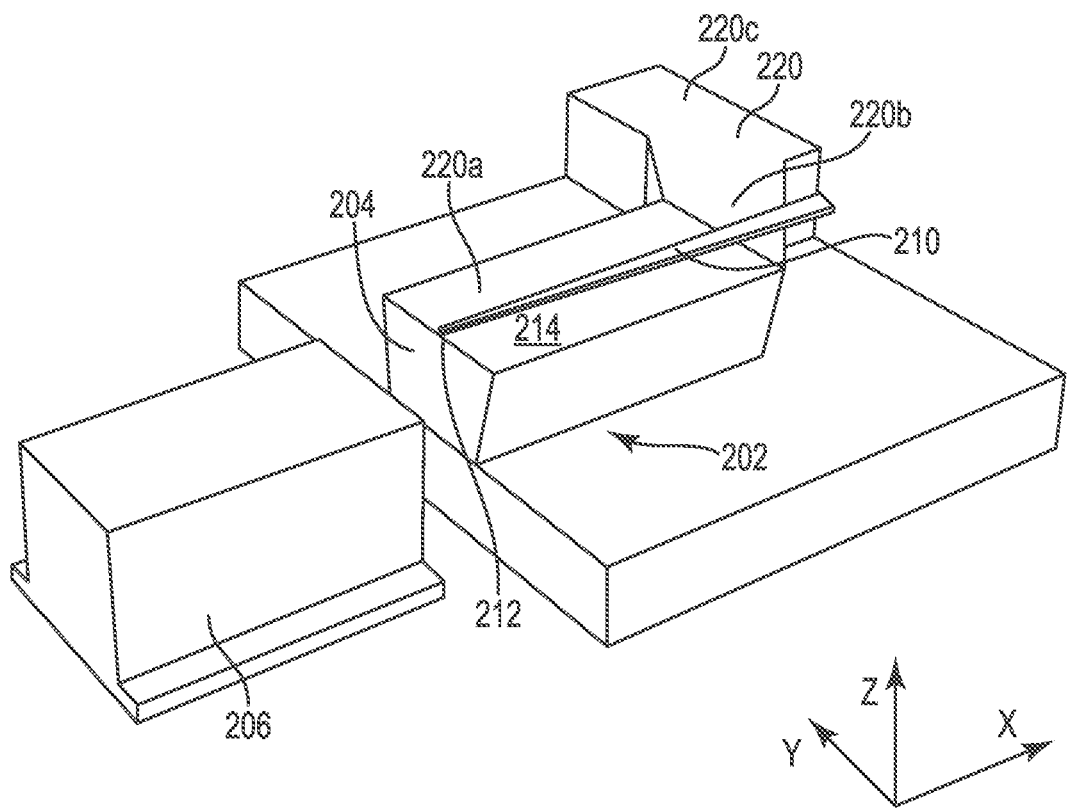
FIG. 4C

HAMR READ-WRITE HEAD WITH COUPLER AND WAVEGUIDE

PRIORITY CLAIM

This application claims the benefit of U.S. Provisional Patent Application Ser. Nos. 63/215,955, filed Jun. 28, 2021, entitled "METHODS TO SUPPRESS THE LASER POWER VARIATION FOR HAMR R/W HEAD", wherein said application is incorporated herein by reference in its entirety for all purposes

FIELD

The invention relates to heat assisted magnetic read-write heads that include a coupler, a waveguide, a transducer, and appurtenant structures, and related methods.

BACKGROUND

Laser power stability is an important performance feature for a heat-assisted magnetic recording (HAMR) read-write head used for digitally recording information on a magnetic medium. High levels of laser power variation can lead to reduced performance of a HAMR read-write head, with possible data loss.

SUMMARY

The following describes designs of light guidance systems of HAMR read-write heads that include a light source (referred to as a "laser"), a coupler optically connected to the light source, a waveguide optically connected to the coupler, and a transducer that receives light energy from the waveguide. Light guidance systems of the present description are designed to reduce the variability of the power of light energy that is received by the transducer.

The amount (power) of light energy that passes through a light guidance system of a HAMR read-write head can be reduced or may experience variability due to features of the laser and the light emitted by the laser, due to features of a coupler, and features of a waveguide. Different physical features of the coupler and waveguide components of the light guidance system, such as indices of refraction and dimensions, can affect how light energy passes through the system, and, therefore, performance of the system with respect to power variability and the overall amount (efficiency) of light from the light source that reaches the transducer. Also affecting performance is the manner in which the different components fit and interact optically.

As one example of how a design of the coupler and waveguide components affects performance, an amount of reflection of light at an interface of a coupler or waveguide reduces performance. An amount of light that is reflected at an interface between a laser and a coupler, and at an interface between a coupler and a waveguide, will reduce the amount of light that is transmitted through the system from the laser to the transducer. The amount of light that is reflected is affected by factors such as refractive indices of the components (and differences in their refractive indices), alignment between the laser and the coupler, and dimensions of the coupler and waveguide relative to the frequency or mode of the laser. Examples of light guidance systems of a HAMR read-write head of the present description may be designed to reduce reflection at interfaces of the system.

A different example of reduced performance of a light guidance system is referred to as "mode hopping." The output of a semiconductor laser can vary based on the temperature of the laser. A temperature of a laser, in turn, can vary during use. In some temperature ranges the output (power output) of the laser varies gradually or linearly. But in other temperature ranges the output (power) level may change in erratic shifts or "jumps." These occur when the laser switches from one longitudinal mode to another, which is referred to as "mode hopping." Under some circumstances, these mode hops occur in an erratic manner, with the laser switching back and forth rapidly between wavelengths. During mode hopping, the laser's power output fluctuates. Examples of light guidance systems of a HAMR read-write head of the present description may be designed to reduce the effects of mode hopping.

A different example of reduced performance of a light guidance system can occur due to a failure to properly align a light source with a coupler of a light guidance system, which is referred to as a "misalignment" of the light source with the coupler. Examples of light guidance systems of a HAMR read-write head of the present description may be designed to reduce the sensitivity of a light guidance system to misalignment.

As described herein, the Applicant has identified HAMR read-write head designs that include a laser, a coupler, and a waveguide, that can operate with useful or advantageous levels of power variability and efficiency.

In one aspect, the invention relates to an apparatus. The apparatus includes: an optical coupler that receives light from a light source at a coupler input facet, the optical coupler having a length that extends from the coupler input facet in a direction of light propagation through the optical coupler; a waveguide coupled to the optical coupler along the length of the optical coupler at a coupler-waveguide interface, the coupler-waveguide interface being spaced from the coupler input facet; and a near-field transducer coupled to the waveguide, that provides electromagnetic heating for a heat assisted magnetic recording write head.

In another aspect, the invention relates to an apparatus. The apparatus includes: an optical coupler that receives light from a light source at a coupler input facet, the optical coupler having a length extending from the input facet in a direction of light propagation through the optical coupler, the optical coupler having a trapezoidal cross section; a waveguide coupled to the optical coupler along the length of the optical coupler at a coupler-waveguide interface; and a near-field transducer coupled to the waveguide, that provides electromagnetic heating for a heat assisted magnetic recording write head.

In another aspect, the invention relates to a method of recording data using a heat assisted magnetic recording head. The magnetic recording head includes: a light source; an optical coupler that receives light from a light source at a coupler input facet, the optical coupler having a length that extends from the coupler input facet in a direction of light propagation through the optical coupler; a waveguide coupled to the optical coupler along the length of the optical coupler at a coupler-waveguide interface, the coupler-waveguide interface being spaced from the coupler input facet; and a near-field transducer coupled to the waveguide, that provides electromagnetic heating for a heat assisted magnetic recording write head. The method includes: activating the light source to direct light into the coupler input facet; and allowing the light to propagate through the optical coupler and into the waveguide, to be received by the near-field transducer.

In yet another aspect, the invention relates to a method of recording data using a heat assisted magnetic recording head. The magnetic recording head includes: a light source; an optical coupler that receives light from a light source at a coupler input facet, the optical coupler having a length extending from the input facet in a direction of a light propagation through the optical coupler, the coupler having a trapezoidal cross section; a waveguide coupled to the optical coupler along the length of the optical coupler at a coupler-waveguide interface; and a near-field transducer coupled to the waveguide, that provides electromagnetic heating for a heat assisted magnetic recording write head. The method includes: activating the light source to direct light into the coupler input facet; and allowing the light to propagate through the optical coupler and into the waveguide, to be received by the near-field transducer.

BRIEF DESCRIPTION OF THE DRAWINGS

FIG. 3A is a top view; FIG. 3B includes an upper perspective view at the top of the figure, and a partial side view and a partial end view at the bottom of the figure.

FIG. 4A is an end view of a light guidance system having a rectangular coupler cross-section.

FIG. 4B is an end view of a light guidance system having a trapezoidal coupler cross-section, as described.

FIG. 4C is a top perspective view of a light guidance system having a trapezoidal coupler cross-section, as described.

The drawings are exemplary, non-limiting, schematic, and are not to scale.

DETAILED DESCRIPTION

The present disclosure is generally related to heat-assisted magnetic recording (HAMR) devices and their related methods, which are also referred to as energy-assisted magnetic recording (EAMR), thermally-assisted recording (TAR), thermally-assisted magnetic recording (TAMR), etc. In a HAMR read-write head, a near-field transducer concentrates light energy into a tiny optical spot in a recording layer of a recording media, which raises the media temperature locally. The hotspot reduces the writing magnetic field required for high-density recording, and the size (area) of the hot spot determines the data bit dimension.

The HAMR read-write head is incorporated into a "slider" that includes the read-write head that includes the near-field transducer, a light source (e.g., laser), a light guidance system that directs the light energy to the near-field transducer, a write pole, an air-bearing surface that controls a spacing between the slider and the recording media during use, among other structures that are useful for the read-write head.

The light guidance system includes a coupler, a waveguide, and cladding at surfaces of the waveguide or coupler to surround the waveguide or coupler. The waveguide is made of material that has a high index of refraction, the cladding is made of material that has lower index of refraction, and the coupler is made of material that has an index of refraction that is between the cladding and the waveguide. An example of a material useful for a waveguide is a niobium oxide (generally referred to as NbOx), but other materials are also useful, including a tantalum oxide (generally referred to as TaOx), a titanium oxide (generally referred to as TiOx), SiN, SiON. Examples of materials useful for a coupler include SiON and AlOx, but other materials are also useful. An example of a material useful for cladding is $SiO_2$, but other materials are also useful.

The laser ("light source") is bonded to the slider on a mounting surface (e.g., a top surface) of the slider. Light that is emitted from the laser enters the light guidance system through the coupler or the waveguide, passes from the coupler (sometimes referred to as an "input coupler" or a "waveguide coupler") into the waveguide, then propagates in a direction away from the laser, through the waveguide, to contact the near-field transducer located at the air-bearing surface (ABS) of the slider. A laser of a light guidance system as described can have any useful design, including a useful length, e.g., a length in a range from 100 microns to 350 microns.

Figure 1A:
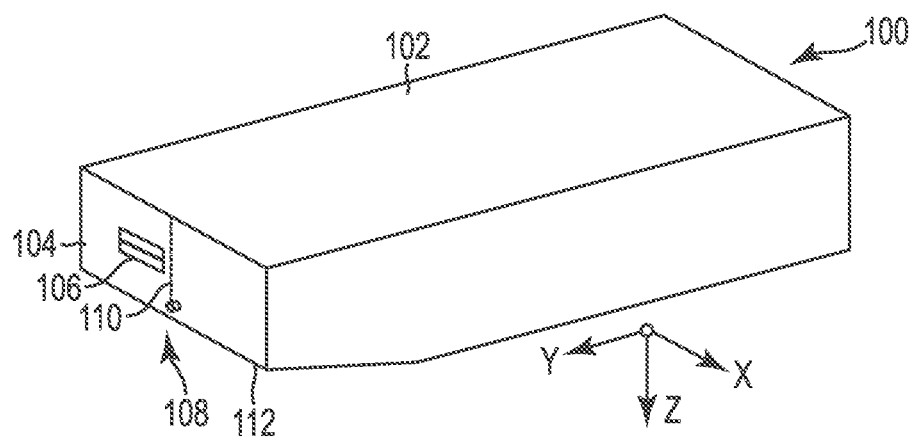
FIGS. 1A and 1B show example structures of a heat-assisted magnetic recording device.

Read-write head 100 is shown at FIG. 1A. Head 100 may be used in a HAMR hard disk drive. Head 100 has a slider body 102 with integrated read-write transducers 108 at trailing edge 104. During use, transducers 108 are held near to but without contacting a surface of a moving magnetic recording medium (not shown), e.g., a magnetic disk. The illustrated head 100 is configured as a HAMR read-write head with light source 106 (e.g., laser diode unit) and waveguide 110 (illustrated in FIG. 1A schematically as a centerline of a waveguide), both of which are integrated into slider body 102. Waveguide 110 delivers electromagnetic energy that is emitted by light source 106, to a near-field transducer (NFT) that is part of the read-write transducers 108. The near-field transducer achieves surface plasmon resonance and directs energy from media-facing surface 112 toward an adjacent magnetic recording medium, to create a small hot spot at a surface of the adjacent recording medium.

Figure 1B:
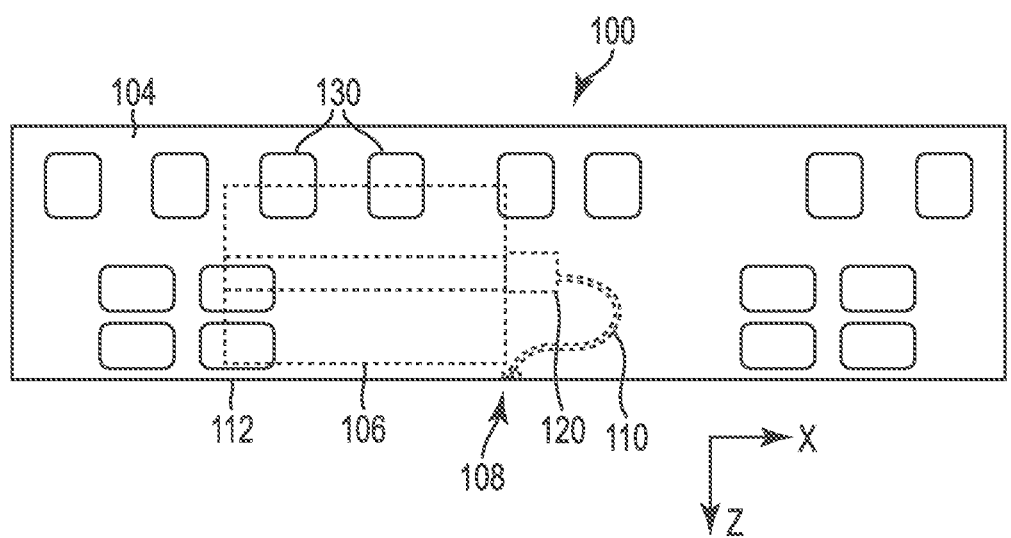

Referring to FIG. 1B, a view of trailing edge 104 of slider body 102 shows additional details. Trailing edge surface 104 is parallel to a substrate upon which components of head 100 are built using layer deposition and transfer printing techniques. Components that are integrated into head 100 include waveguide 110, light source 106, read-write transducers 108, and optical coupler 120. Light source 106 is incompatible with growth on the substrate and other material layers, and is integrated by transfer printing or an equivalent thereof. After material layers are deposited to form the components, conductive pads 130 are formed on trailing edge surface 104. Pads 130 are bonded to electrical lines (e.g., flex circuits) that carry signals between head 100 and controller circuitry of a magnetic recording drive.

In this example, light source 106 is oriented with an elongated dimension in the cross-track direction (x-direction in these figures). Generally, light source 106 will include an active laser region (also referred to as a quantum well, gain region, etc.) that is formed of one or more non-self-supporting layers of crystalline material. By orienting light source 106 in the cross-track direction, a desired optical output and wavelength can be obtained while minimizing the height of the head 100 (measured normal to the media-facing surface 112, in the "z-direction"). A reduced height of head 100 reduces the clearance needed above the slider and allows for closer vertical stacking magnetic recording disks.

FIG. 1B shows optical coupler 120, which provides an optical connection and optical communication between light source 106 and waveguide 110, i.e., which "couples" the light emitted from light source 106 with waveguide 110.

Example read-write heads of the present description are assembled to have components that include a light source, a coupler, and a waveguide as components of a light guidance system. A cladding layer is located at outer surfaces of the waveguide and the coupler. These components are part of an assembled HAMR read-write head, and cooperate with other components of the head (a write pole, an air-bearing surface, electrical communications) to perform reading and writing functionalities as part of a HAMR disk drive.

The design of the components of a light guidance system (e.g., shapes and dimensions of the components) of the present description and how the components are assembled together (e.g., sizes and locations of interfaces) can produce a read-write head that operates with a useful or an advantageous level of variability of power supplied to a near-field transducer. The head may also exhibit reduced negative performance effects caused by mode-hopping of a laser light source, and may perform at a useful or advantageous level of efficiency and power variability when transmitting light from a light source through the coupler and waveguide to the near field transducer.

Systems as described can be designed to reduce reflection at interfaces of a waveguide and a coupler of the system, which can increase coupling efficiency. According to certain example systems, reflection at an interface of the waveguide or the coupler can be reduced by placing an input end of the waveguide (the end of the waveguide that is closest to the light source) at a recessed position relative to an input end of the coupler—the input end of the waveguide is in a "recessed" position, meaning the input end of the waveguide is spaced from an input end of the coupler and the light source and does not include a waveguide input facet located adjacent to the light guide.

Generally, a light guidance system includes an "input end," which is an end of the system that engages or is closest to the light source. Light from the light source enters the light guidance system at the input end and travels through the coupler and through the waveguide in a direction of propagation away from the light source, in a direction toward a near-field transducer, and is delivered at an output end of the waveguide that is in optical contact with the near-field transducer. The coupler includes a coupler input facet that is in optical communication with the light that is emitted by the light source and receives light energy directly from the light source through the coupler input facet.

Figure 2A:
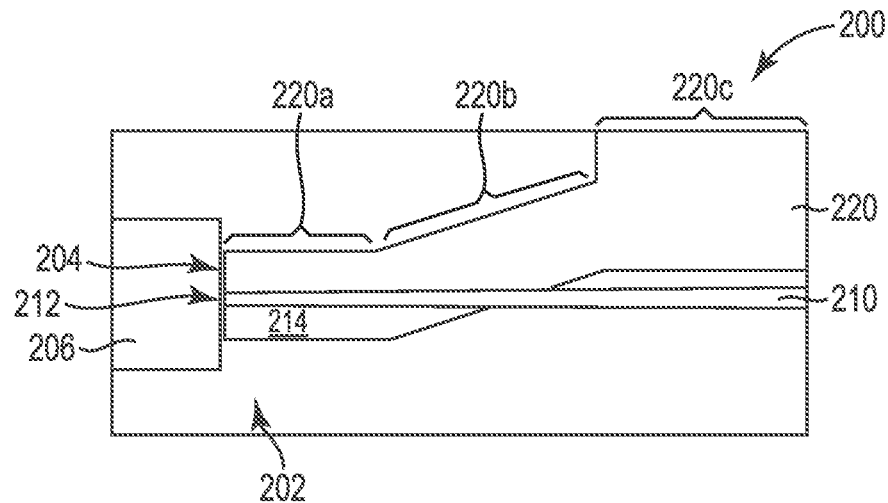
FIGS. 2A and 2B show example structures of a light guidance system of a heat-assisted magnetic recording device.
Figure 2B:
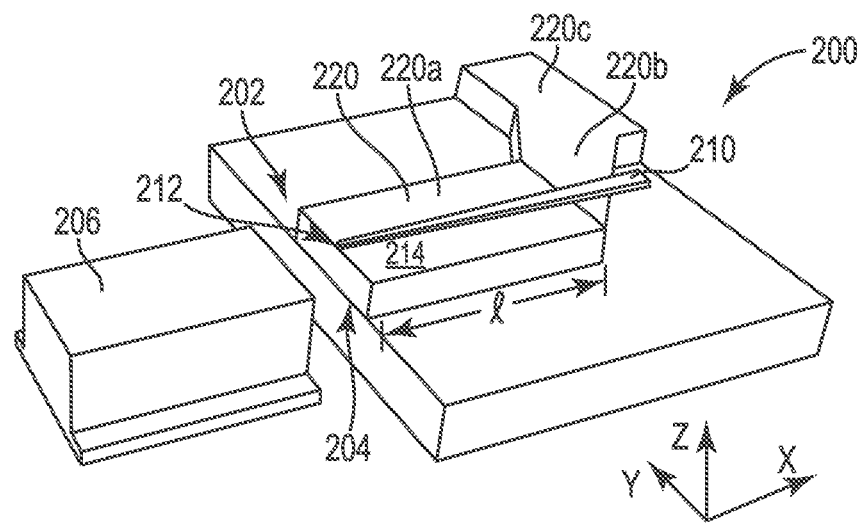
Figure 2B:
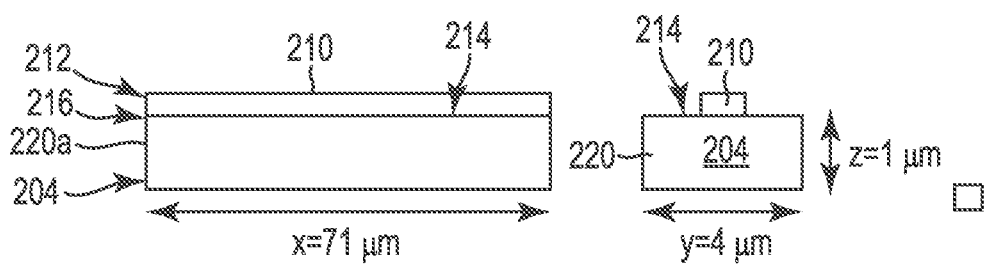

According to a previous waveguide design, an input end of a waveguide and an input end of a coupler both have an input facet that directly faces and is optically connected to the light source, to receive light directly from the light source through the waveguide input facet. As shown at FIGS. 2A and 2B, light guidance system 200 includes light source 206, coupler 220, and waveguide 210. Connector 220 includes straight portion 220a at the input end of system 200, which includes input facet 204 having an area that faces light source 206 to directly receive light from light source 206. Connector 220 additionally includes angled portion 220b that connects at one end to straight portion 220a, and that connects at a second end to end portion 220c. End portion 220 functions as an "escape slab," which is designed to allow any light that passes into the escape slab to be scattered as incoherent light away from the waveguide.

At input end 202 of system 200 of FIGS. 2A and 2B, coupler 220 and waveguide 210 are each in optical communication with light source 206. At input end 202, coupler 220 includes input facet 204, which has an area that faces light source 206. Also at input end 202, waveguide 210 includes input facet 212 having an area that faces light source 206 to directly receive light from light source 206. In this system, a portion of light that is emitted from light source 206 enters coupler 220 through coupler input facet 204, and a portion of the light also enters waveguide 210 through waveguide input facet 212.

Light passes into waveguide 210 through waveguide input facet 212, and light also passes into waveguide 210 from coupler 220. Waveguide 210 is optically connected to coupler 220 at coupler-waveguide interface 216, which is an area of contact between a bottom (in the z-direction as illustrated) surface of waveguide 210 and an upper surface 214 of coupler 220, along a length (x-direction) and a width (y-direction) of waveguide 210 starting at waveguide input facet 212 and extending along coupler-waveguide interface 216 at straight portion 220a, and along part of angled portion 220b. Light that enters coupler 220 through coupler input facet 204 travels within coupler 220, and a portion of the light passes from coupler 220 into light guide 210 by passing through coupler-waveguide interface 216.

The light that enters waveguide 210, either by passing through coupler-waveguide interface 216 or by entering waveguide 210 through waveguide input facet 212, travels in a light propagation direction away from light source 206, along a length of waveguide 210, and eventually is received by a near field transducer (not shown). Waveguide 210 is tapered, with a width that gradually increases along the length direction in a direction away from a waveguide input end (the end closest to a light source). The waveguide width gradually increases along the length of the waveguide extending away from the input end, while the height remains constant along the length. According to example tapered waveguides, a height (in a z-direction) of the waveguide may be in a range from 80 to 160 nanometers, e.g., from 100 to 140 nanometers, and remains constant along the length. Also according to example tapered waveguides, widths along the length may be in a range from about 100 nanometers up to 2000 nanometers. For example, a width at a waveguide input end may be in a range from 50 to 200 nanometers, and the width can increase to a maximum width in a range from 1000 to 1500 nanometers, e.g., from 1100 to 1300 nanometers. These dimensions are listed as examples, and dimensions outside of these ranges can also be useful.

The insert at the bottom of FIG. 2B shows an example of a length (1) of a straight portion 220a of coupler 220 (71 microns) and a width (4 microns) and height (1 micron) of straight portion 220a of coupler 220 at coupler input facet 204. The insert also shows that waveguide 210 extends the entire length of straight portion 220a of coupler 220, with waveguide input facet 212 being aligned vertically (in the z-direction) with coupler input facet 204.

In example couplers, a useful length of a straight portion 220a of a waveguide may be in a range from 40 to 120 microns, e.g., from 55 to 95 microns. Also according to example couplers, an example width may be in a range from 2 to 6 microns, and an example thickness may be in a range from 0.5 to 2 microns.

In contrast to the design shown at FIGS. 2A and 2B, some versions of light guidance systems of the present description place an input end of the waveguide (meaning the end closest to the light source) at a recessed position, a distance away from light source 206 along the length of coupler straight portion 220a, and the waveguide does not include a waveguide input facet that directly receives light from the light source. Instead, the waveguide input end connects optically with the coupler but does not extend to the light source and does not include a waveguide input facet that faces and optically communicates directly with the light source. The waveguide does not receive light energy directly from the light source through a waveguide input facet, but the waveguide is in optical communication with the coupler at a coupler-waveguide interface. The waveguide receives light energy from the light source by the light traveling from the light source into the coupler through a coupler input facet, then by the light passing from the coupler into the waveguide through the coupler-waveguide interface.

Figure 3A:
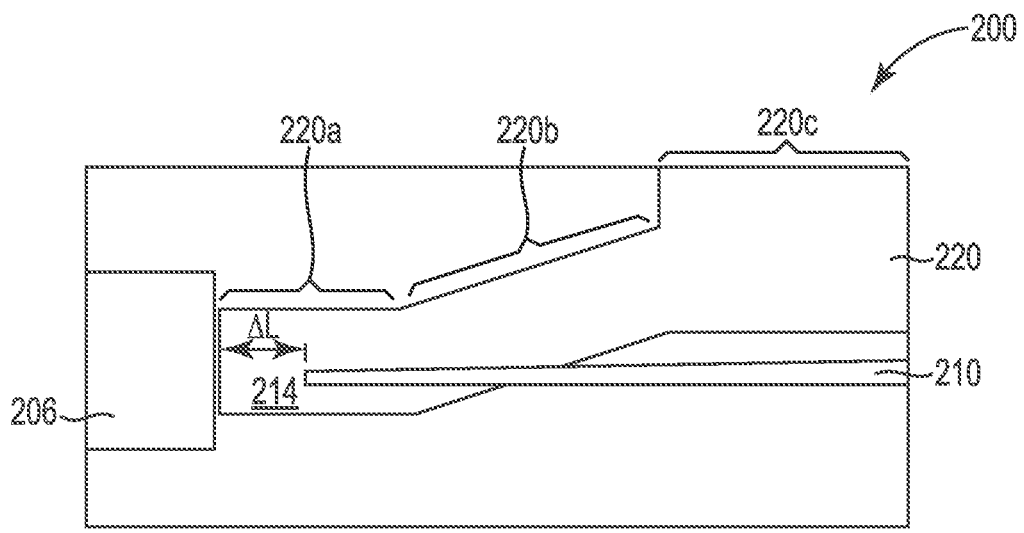
FIGS. 3A and 3B show example structures of light guidance systems as described.
Figure 3B:
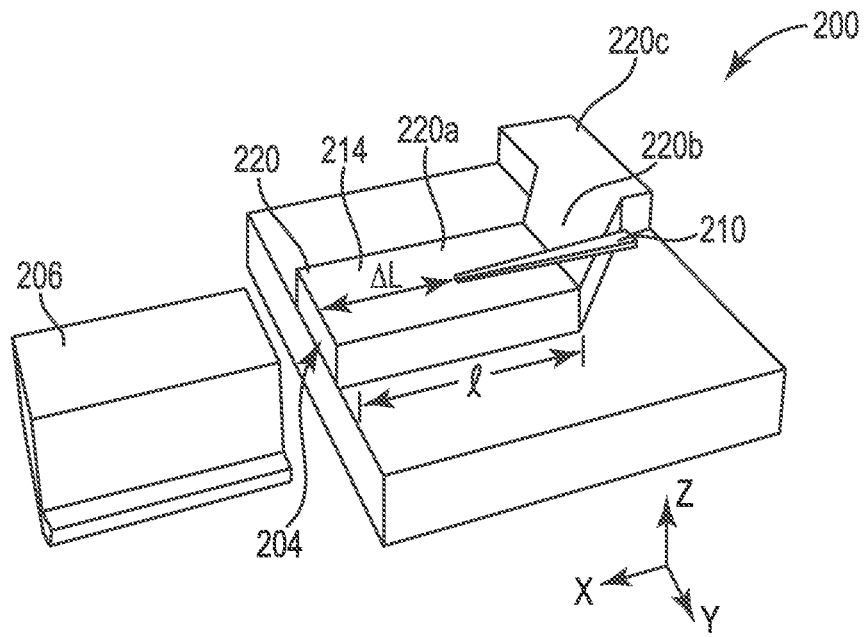
Figure 3B:
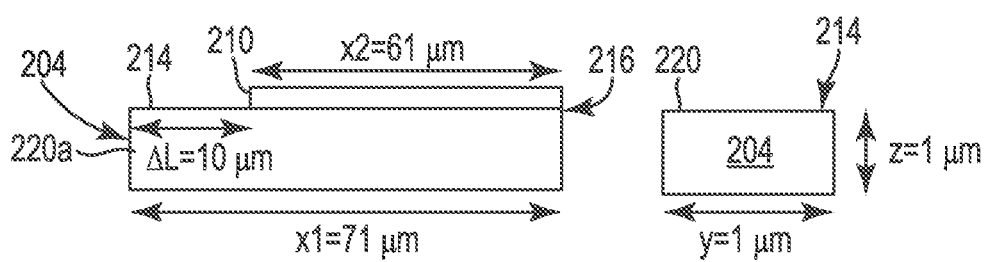

An example of such a waveguide and light guidance system is shown at FIGS. 3A and 3B, which use numerical designations that are the same as those used for the description of system 200 of FIGS. 2A and 2B. As shown at FIGS. 3A and 3B, light guidance system 200 includes light source 206, coupler 220, and a waveguide 210, which may be tapered. Coupler 220 includes a straight portion 220a at the input end of system 200, which includes input facet 204 having an area that directly receives light from light source 206. Coupler 220 additionally includes angled portion 220b that connects at one end to straight portion 220a and that connects at the other end to end portion 220c.

At input end 202 of system 200, coupler 220 is in optical communication with light source 206. Coupler input facet 204 has an area that faces light source 206 such that light emitted from light source 206 enters coupler 220 through coupler input facet 204. Waveguide 210 is optically connected to coupler 220 at coupler-waveguide interface 216 along a length (x-direction) and a width (y-direction) of waveguide 210 that extends along a partial length of straight portion 220a and along part of angled portion 220b. Light that enters coupler 220 through coupler input facet 204 travels within coupler 220 and can pass from coupler 220 into waveguide 210 by passing through coupler-waveguide interface 216.

The insert at the bottom of FIG. 3B shows an example of a length (l) of straight portion 220a of coupler 220 (71 microns) and a width (1 microns) and height (1 micron) of the straight portion 220a of coupler 220 at coupler input facet 204. The insert also shows a length (61 microns) of waveguide 210 along straight portion 220a, which is less than the length (71 microns) of straight portion 220a.

The length of the recess ΔL (or "recess length"), which is a distance from input facet 204 to an end of waveguide 210 in the x-direction, is shown in this example as 10 microns. A useful recess length can be one that improves coupling efficiency of the lightguide system by reducing optical reflection at waveguide input facet 204. A useful recess length will depend on features of the light guidance system that cause reflectivity at input facet 204, with examples of useful or preferred recess lengths being in a range from 1 to 30 microns, or from 2 to 20 microns or from 5 to 15 microns.

A light guidance system such as that shown at FIGS. 3A and 3B, that includes a recessed waveguide, can exhibit useful or improved performance compared to comparable light guidance systems that include a comparable coupler and a waveguide that is comparable but not recessed, as with the version of the light guidance system shown at FIGS. 2A and 2B.

Additionally or separately, a system of FIGS. 3A and 3B may include a coupler that has a cross section that is dimensioned to have thickness and height dimensions to provide a useful or advantageous coupling efficiency. Dimensions of the cross section of the coupler may be selected, e.g., based on mode matching, to produce a high coupling efficiency. The dimensions of the coupler that will result in useful or preferred coupling efficiency will be different with a recessed waveguide, as described, compared to useful or preferred dimensions of a coupler of a comparable system that includes a waveguide that is not recessed.

A light guidance system such as that shown at FIGS. 3A and 3B, having a recessed waveguide, can exhibit useful or improved performance compared to comparable light guidance systems that include a comparable coupler and a non-recessed waveguide, e.g., light guidance system as shown at FIGS. 2A and 2B.

Figure 3C:
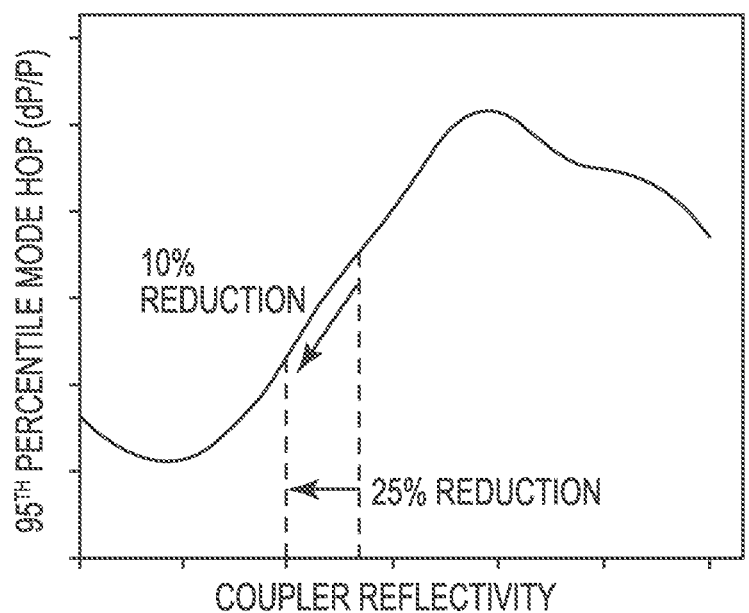
FIG. 3C is a graph of a mode-hopping effect versus reflectivity of a coupler.

For example, a recessed waveguide can result in a reduced mode hop effect as shown at FIG. 3C. A recessed waveguide as described can produce reduced "coupler reflectivity." "Coupler reflectivity" refers to reflection that occurs at the coupler-waveguide interface, and may be measured at the coupler input facet. The reduced coupler reflectivity can have an effect of reducing mode hop. See FIG. 3C. Without being bound by any specific mechanism, a reduced coupler reflectivity may reduce the intensity of reflections that travel back to the light source. As a result, the magnitude of the disturbance of the optical output of the light source (mode hop) is commensurately reduced.

Figure 3D:
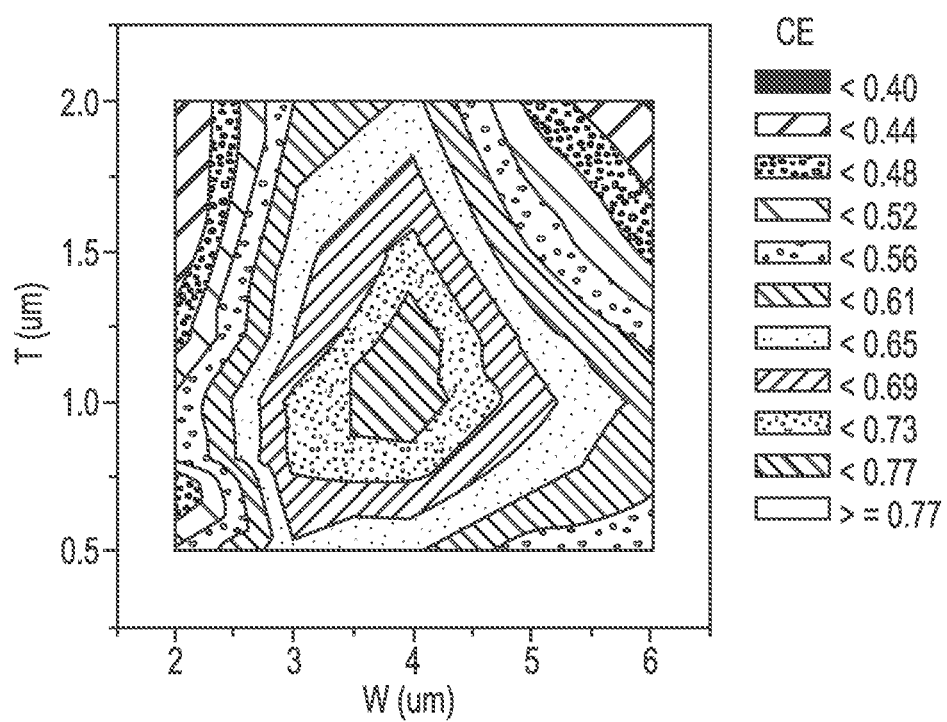
FIG. 3D is a graph of coupling efficiency (CE) values of couplers versus width (W, microns) and thickness (T, microns) dimensions of the coupler. Each region defines a range of coupling efficiency. The center region represents coupling efficiency values from a maximum coupling efficiency value of about 0.77, to 0.73. The first region surrounding the center region represents coupling efficiency values from 0.73, to 0.69. Lower coupling efficiency value ranges extend from the center maximum range.

Also, as shown at FIG. 3D, light guidance system that includes a recessed waveguide as described can exhibit desired coupling efficiencies based on a range of width and thickness dimensions of the coupler, e.g., a coupler width in a range from 2 to 6 microns and a coupler thickness in a range from 0.5 to 2 microns.

According to these and other example systems, performance of the coupler at a coupler input facet can be improved (e.g., reflection can be reduced) by a coupler having a cross-sectional shape that is trapezoidal, including the coupler input facet having a cross-sectional shape that is trapezoidal. Without wishing to be bound by a particular mechanism, a trapezoidal cross section of a coupler can improve modal overlap of a laser beam. The beam emitted from the laser is non-uniform, as the emission is typically from a ridge laser which has an intrinsic non-uniformity due to the presence of the ridge. The trapezoid shape of the coupler provides a better modal overlap between laser beam and coupler, as the non-uniformity of the coupler mode is more similar to the emitted mode, as compared to a rectangular coupler.

Figure 4D:
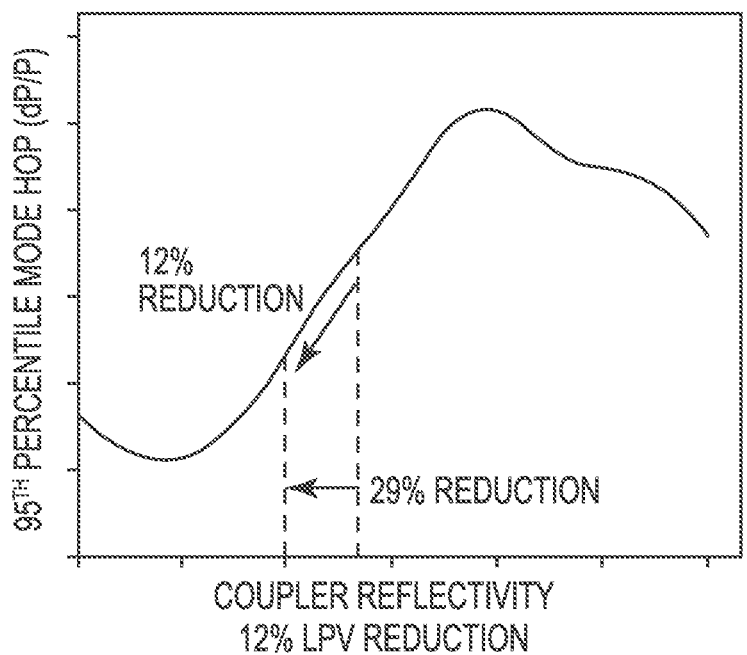
FIG. 4D is a graph of a mode-hopping effect versus coupler reflectivity.

A coupler having a design as shown at FIGS. 2A and 2B has a rectangular cross section (shown also at FIG. 4A) and a rectangular input facet 204. A top surface of coupler 220 of FIGS. 2B and 4A has a width that is essentially the same as a width at the bottom surface of the coupler. Some variation may exist due to manufacturing techniques, but angles of corners of the cross section should vary by less than 3 degrees F.rom square (ninety degrees), e.g., should be in a range from 87 to 93 degrees.

Instead of a rectangular cross section and square (approximately 90 degree) corners, an input end of a coupler 220 and a coupler input facet 204 can be trapezoidal, with a top surface (214) of the coupler having a width (w2) that is more than insubstantially longer than a width (w1) at a bottom surface (218) of the coupler. See FIGS. 4B and 4C. Corners of the coupler, when viewed in cross section, are not square. A novel coupler as described may have corners formed between a bottom surface 218 of coupler 220 and connected sides, that have an angle (a) that is greater than 93 degrees, e.g., at least 93.5, 94, 95, or 96 degrees.

An example of such a waveguide and light guidance system is shown at FIGS. 4B and 4C. As illustrated, light guidance system 200 includes light source 206, coupler 220, and waveguide 210, which has a trapezoidal cross section at input end 202 and input facet 204, with a width of the top surface 214 of the coupler being longer than the width of the bottom surface 218 of the coupler. Coupler 220 includes a straight portion 220a at the input end of system 200, which includes coupler input facet 204 having an area and surface that directly receive light energy from light source 206. Coupler 220 additionally includes angled portion 220b that connects at one end to straight portion 220a and that connects at the other end to end portion 220c.

At input end 202 of system 200, coupler 220 is in optical communication with light source 206. Coupler input facet 204 has an area that faces light source 206 such that light emitted from light source 206 enters coupler 220 through coupler input facet 204. Waveguide 210 is optically connected to coupler 220 at coupler-waveguide interface 216 along a length (x-direction) and a width (y-direction) of waveguide 210 and extends along straight portion 220a and along part of angled portion 220b. Light that enters coupler 220 through coupler input facet 204 travels within coupler 220 and can pass from coupler 220 into waveguide 210 by passing through coupler-waveguide interface 216. As illustrated, waveguide 210 is not recessed, and includes waveguide input facet 212, facing light source 206.

Optionally, waveguide 210 of the system of FIGS. 4B and 4C, which includes coupler 210 having a trapezoidal cross-section, may instead be recessed as shown and described herein, for example at FIGS. 3A and 3B. The system may include both features of a recessed waveguide and a coupler having a trapezoidal cross section.

FIGS. 4B and 4C, which illustrate a coupler that includes a trapezoidal cross-section, also show a waveguide 210 that is not recessed. In other examples of light guidance systems of the present description, the system may include both a recessed waveguide as described, and a coupler that has a trapezoidal cross section.

Similarly, a light guidance system as described can include other added features that can allow for improved performance. These include features described in U.S. Provisional Patent Application No. 63/215,955, filed Jun. 28, 2021, entitled "METHODS TO SUPPRESS THE LASER POWER VARIATION FOR HAMR R/W HEAD," such as a diffractive cavity along a length of the coupler, and an optional reduced-length laser, as also described in Applicant's co-pending United States patent application titled "HAMR READ-WRITE HEAD WITH COUPLER AND WAVEGUIDE" having application Ser. No. 17/851,367, filed on Jun. 28, 2022, now U.S. Pat. No. 11,837,256 (Harvey et al.), the entirety of which is incorporated herein by reference. For example, a light guidance system may include a combination of two or more features selected from: a recessed waveguide, a coupler that has a trapezoidal cross section, and a diffractive cavity.

In example versions of these couplers, angles of corners that connect the sides of the coupler to the bottom surface of the coupler may be larger than an angle that may occur un-intentionally due to processing variations in manufacturing methods that are intended to produce a rectangular, non-trapezoidal cross-section with angles at corners that are as close as possible to 90 degrees. By manufacturing methods used to prepare square corners of rectangular couplers, the amount of variation in the angles of the corners can be up to about 3 degrees F.rom square (90 degrees).

A novel coupler as described may have dimensions that produce the tapered sides, including a top surface 214 that is wider than a bottom surface 218 by at least 5, 10, 30, 40, or 50 percent. Examples of bottom surfaces 218 of example coupler 220 may have a width in a range from 1 to 4 microns. Examples of top surfaces 214 of example coupler 220 may have a width in a range from 2 to 6 microns.

A light guidance system such as that shown at FIGS. 4B and 4C, having a waveguide with a trapezoidal cross-sectional shape, can exhibit useful or improved performance compared to comparable light guidance systems that include a comparable coupler that has a substantially rectangular cross-sectional shape, as with the version of the light guidance system shown at FIGS. 2A and 2B (and 4A).

For example, a trapezoidal waveguide as described can produce reduced "coupler reflectivity" as described. See FIG. 4D.

Figure 4E:
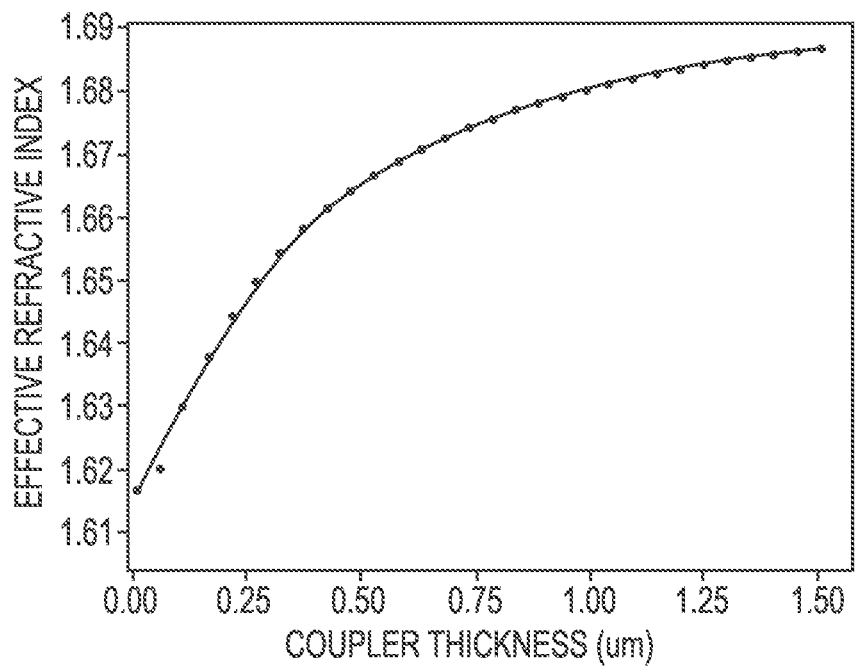
FIG. 4E is a graph of effective refractive index versus coupler thickness.

Also, as shown at FIG. 4E, a trapezoidal coupler can have a useful or advantageous "effective refractive index," particularly at relatively higher thicknesses, e.g., greater than 0.5 micron.

The devices and structures described herein can be prepared by known methods of preparing microelectronic devices, including heat-assisted magnetic recording heads. Example techniques include layer deposition steps, epitaxial growth, masked etching, photolithography, etc., to form desired optical, magnetic, and electronic components of the recording heads. Other techniques include those referred to as transfer printing, dry transfer printing, and nanotransfer printing, and on-wafer laser (OWL) process integration. Example methods are described in U.S. Pat. No. 10,783,917, the entirety of which is incorporated herein by reference.

The invention claimed is:
1. An apparatus comprising:
   an optical coupler that receives light from a light source at a coupler input facet, the optical coupler having a length that extends from the coupler input facet in a direction of light propagation through the optical coupler,
   a waveguide coupled to the optical coupler along the length of the optical coupler at a coupler-waveguide interface, wherein the coupler-waveguide interface is spaced a distance in a range from 1 to 30 microns from the coupler input facet, and
   a near-field transducer coupled to the waveguide, that provides electromagnetic heating for a heat assisted magnetic recording write head.
2. An apparatus of claim 1, the optical coupler having a straight portion that has a length in a range from 40 to 120 microns.
3. An apparatus of claim 1, the optical coupler having a thickness in a range from 0.5 to 2 microns, and a width in a range from 2 to 6 microns.
4. An apparatus of claim 1, wherein a refractive index of the waveguide is greater than a refractive index of the optical coupler.
5. An apparatus of claim 1, wherein the waveguide is made of NbOx.
6. An apparatus of claim 1, wherein the optical coupler is made of SiON.

7. An apparatus of claim 1, comprising cladding that surrounds the optical coupler, wherein the cladding is made of $SiO_2$.

8. A method of recording data using an apparatus of claim 1.

9. A method of preparing a light guidance system comprising an apparatus of claim 1, the apparatus comprising:
   a light source,
   an optical coupler that receives light excited by a light source at a coupler input facet, the optical coupler having a length extending from the input facet in a direction of a light propagation through the optical coupler,
   a waveguide coupled to the optical coupler along the length of the optical coupler at a coupler-waveguide interface, wherein the coupler-waveguide interface is spaced a distance in a range from 1 to 30 microns from the coupler input facet, and
   a near-field transducer coupled to the waveguide, that provides electromagnetic heating for a heat assisted magnetic recording write head,
the method comprising forming the waveguide to form the coupler-waveguide interface spaced from the coupler input facet.

10. An apparatus comprising:
   an optical coupler that receives light from a light source at a coupler input facet, the optical coupler having a length that extends from the coupler input facet in a direction of light propagation through the optical coupler, wherein the optical coupler has a straight portion having a length in a range from 40 to 120 microns,
   a waveguide coupled to the optical coupler along the length of the optical coupler at a coupler-waveguide interface, the coupler-waveguide interface being spaced from the coupler input facet, and
   a near-field transducer coupled to the waveguide, that provides electromagnetic heating for a heat assisted magnetic recording write head.

11. An apparatus of claim 10, the optical coupler having a thickness in a range from 0.5 to 2 microns, and a width in a range from 2 to 6 microns.

12. An apparatus of claim 10, wherein a refractive index of the waveguide is greater than a refractive index of the optical coupler.

13. An apparatus of claim 10, wherein the waveguide is made of NbOx.

14. An apparatus of claim 10, wherein the optical coupler is made of SiON.

15. An apparatus of claim 10, comprising cladding that surrounds the optical coupler, wherein the cladding is made of $SiO_2$.

16. An apparatus comprising:
   an optical coupler that receives light from a light source at a coupler input facet, the optical coupler having a length that extends from the coupler input facet in a direction of light propagation through the optical coupler, wherein the optical coupler comprises:
     a thickness in a range from 0.5 to 2 microns, and
     a width in a range from 2 to 6 microns,
   a waveguide coupled to the optical coupler along the length of the optical coupler at a coupler-waveguide interface, the coupler-waveguide interface being spaced from the coupler input facet, and
   a near-field transducer coupled to the waveguide, that provides electromagnetic heating for a heat assisted magnetic recording write head.

17. An apparatus of claim 16, the optical coupler having a straight portion that has a length in a range from 40 to 120 microns.

18. An apparatus of claim 16, wherein a refractive index of the waveguide is greater than a refractive index of the optical coupler.

19. An apparatus of claim 16, wherein the waveguide is made of NbOx.

20. An apparatus of claim 16, wherein the optical coupler is made of SiON.

* * * * *